(12) United States Patent
Razdan et al.

(10) Patent No.: US 6,446,143 B1
(45) Date of Patent: Sep. 3, 2002

(54) METHODS AND APPARATUS FOR MINIMIZING THE IMPACT OF EXCESSIVE INSTRUCTION RETRIEVAL

(75) Inventors: Rahul Razdan, Princeton; Edward John McLellan, Holliston, both of MA (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/200,247

(22) Filed: Nov. 25, 1998

(51) Int. Cl.$^7$ .............................................. G06R 13/14
(52) U.S. Cl. .......................... 710/29; 712/239; 712/24; 713/137
(58) Field of Search .......................... 710/29; 712/239, 712/24; 713/137

(56) References Cited

U.S. PATENT DOCUMENTS

| | | | |
|---|---|---|---|
| 5,146,578 A | * 9/1992 | Zangenehpour | 711/137 |
| 5,390,318 A | * 2/1995 | Ramakrishnan et al. | 711/158 |
| 5,564,118 A | 10/1996 | Steely, Jr. et al. | 395/375 |
| 5,996,061 A | * 11/1999 | Lopez-Aguado et al. | 712/207 |
| 6,098,154 A | * 8/2000 | Lopez-Aguado et al. | 711/137 |
| 6,138,213 A | * 10/2000 | McMinn | 711/137 |
| 6,173,392 B1 | * 1/2001 | Shinozaki | 712/207 |
| 6,219,758 B1 | * 4/2001 | Navarro et al. | 711/137 |
| 6,219,760 B1 | * 4/2001 | McMinn | 711/137 |
| 6,230,260 B1 | * 5/2001 | Luick | 712/239 |
| 6,260,116 B1 | * 7/2001 | Davis et al. | 711/137 |

OTHER PUBLICATIONS

Yeh, Tse–Yu, and Patt, Yale N., "Two–Level Adaptive Training Branch Prediction," Association for Computing Machinery, 0–8791–460–0/91/0011/0051.

Keller, Jim, "The 21264: A Superscalar Alpha Processor with Out–of–Order Execution," Digital Semiconductor, Digital Equipment Corp., Hudson, MA, no date given.

Gieseke, Bruce A., et al., "600 MHz Superscalar RISC Microprocessor With Out–of–Order Execution," Digital Semiconductor, Digital Equipment Corporation, Hudson, MA, no date given.

Gwennap, Linley, "Digital 21264 Sets New Standard," *Microprocessor Report*, 10(14), Oct. 28, 1996.

(List continued on next page.)

*Primary Examiner*—Jeffrey Griffin
*Assistant Examiner*—Abdelmoniem Elamin
(74) *Attorney, Agent, or Firm*—Hamilton, Brook, Smith & Reynolds, P.C.

(57) ABSTRACT

A technique controls memory access requests. The technique involves acquiring a first series of requests including a prefetch request for performing a prefetch operation that prefetches a first set of instructions from a memory, and adding a first entry in a request queue in response to the prefetch request. The first entry identifies the prefetch operation. The technique further involves attempting to retrieve a second set of instructions from a cache to create a cache miss, and generating, in response to the cache miss, a second series of requests including a fetch request for performing a fetch operation that fetches the second set of instructions from the memory to satisfy the cache miss. The technique further involves acquiring the second series of requests that includes the fetch request, and adding a second entry in the request queue in response to the fetch request. The second entry identifies the fetch operation. The technique further involves invalidating the first entry in the request queue when the fetch request is acquired before the prefetch operation initiates, and maintaining the first entry in valid form in the request queue and performing the prefetch operation to completion when the fetch request is acquired after the prefetch operation initiates.

18 Claims, 5 Drawing Sheets

OTHER PUBLICATIONS

Gieseke, Bruce A., et al., "FA 10.7: A 600 MHZ Superscalar RISC Microprocessor with Out–of–Order Execution." Paper presented at the *1997 International Solid–State Circuits Conference*, 0–7803–3721–2/97.

Emer, Joel, and Gloy, Nikolas, "A Language for Describing Predictors and Its Application to Automatic Synthesis," *Proceedings of the 24th Annual International Symposium on Computer Architecture*, Denver, CO, Jun. 2–4, 1997.

Johnson, Mike, "The Role of Exception Recovery." In *Superscalar Microprocessor Design* (New Jersey:PTR Prentice Hall), pp. 87–102 (1991).

* cited by examiner

METHODS AND APPARATUS FOR MINIMIZING THE IMPACT OF EXCESSIVE INSTRUCTION RETRIEVAL

FIELD OF THE INVENTION

This invention relates generally to data processing and in particular to techniques for controlling memory access requests within a data processor.

BACKGROUND OF THE INVENTION

A typical pipelined data processor includes a series of stages beginning with an instruction retrieval (or fetch) stage that retrieves instructions from a memory, and provides them, in the form of an instruction stream, to a subsequent stage within the series of stages for further processing. Typically, the instruction retrieval stage attempts to retrieve and provide as many instructions as possible to maximize processor utilization. That is, the instruction retrieval stage tries to provide the subsequent stage with as many instructions as it can consume.

A typical instruction retrieval stage includes an instruction retrieval circuit and a bus interface circuit. Generally, when the subsequent stage demands a set of instructions from the instruction retrieval stage, the instruction retrieval circuit sends memory access requests to the bus interface. In particular, the instruction retrieval circuit sends an instruction fetch request followed by one or more instruction prefetch requests to the bus interface.

An instruction fetch request instructs the bus interface to read (or fetch) a set of instructions (one or more instructions) in response to a demand for that set from the subsequent stage. An instruction prefetch request instructs the bus interface to speculatively read (or prefetch) a set of instructions from the memory in response to a predicted need for that set by the subsequent stage. Such prefetching attempts to reduce instruction retrieval latency (i.e., the amount of time the subsequent stage must wait for the set of instructions to be retrieved from memory), thus reducing idle time of the subsequent stage and increasing processor utilization.

The bus interface schedules the memory access requests such that they are fulfilled one at a time beginning with the instruction fetch request. Accordingly, for each set demanded by the subsequent stage, the instruction retrieval stage provides a fetched set of instructions and one or more prefetched sets of instructions to the subsequent stage. As a result, the one or more prefetched sets of instructions are made available to the subsequent stage as quickly as possible should the subsequent stage be able to use them.

SUMMARY OF THE INVENTION

It is possible that some instructions retrieved by the instruction retrieval stage will not be needed by the subsequent stage. For example, while the processor executes instructions retrieved from memory, the processor may mispredict the direction of instruction execution, and speculatively execute down an incorrect branch of instructions. In such a situation, the subsequent stage of the processor then demands instructions of the correct branch from the instruction retrieval stage. In general, the processor recovers to an earlier state of execution that existed prior to execution down the incorrect branch. Additionally, the processor typically kills any remaining instructions of the incorrect branch that remain in the pipeline past the instruction retrieval stage to insure correct program behavior and to prevent wasting of processor resources.

When the instruction retrieval stage receives the demand for instructions of the correct branch from the subsequent stage, the instruction retrieval stage operates to satisfy the demand. In particular, the instruction retrieval circuit typically sends new memory access requests to the bus interface for processing. The bus interface then attends to the new memory access requests after satisfying any earlier received memory access requests.

Unfortunately, the earlier received memory access requests may include requests for instructions of the incorrect branch. The processing of such requests by the bus interface causes excessive prefetching of instructions. In particular, it is unlikely that the instructions of the incorrect branch will be executed after being prefetched since the processor has killed other instructions of the incorrect branch and has proceeded to execute down the correct branch.

Furthermore, such excessive prefetching typically wastes processor resources by tying up the bus interface and other processor resources. For example, the bus interface may defer handling the memory access requests for the correct instruction branch. That is, the bus interface may first satisfy the unnecessary instruction prefetch requests for the incorrect instruction branch before satisfying the new memory access requests for the correct instruction branch. In such a situation, the subsequent stage typically waits for the unnecessary instruction prefetch requests to be satisfied before receiving instructions of the correct branch. Additionally, processor resources must then kill the instructions prefetched by these unnecessary instruction prefetch requests.

In contrast to the conventional approaches, an embodiment of the invention is directed to a technique for controlling memory access requests to minimize excessive instruction retrieval and thus reduce wasting of processor resources. The technique involves obtaining a prefetch request for performing a prefetch operation that prefetches a first set of instructions from a memory, and subsequently obtaining a fetch request for performing a fetch operation that fetches a second set of instructions from the memory to satisfy a cache miss. The technique further involves canceling the obtained prefetch request when the fetch request is obtained before the prefetch operation initiates in response to the obtained prefetch request, and performing the prefetch operation to completion when the fetch request is obtained after the prefetch operation initiates in response to the obtained prefetch request. Cancellation of the prefetch request frees processor resources, thus enabling the processor to perform other operations.

Preferably, obtaining the prefetch request and obtaining the fetch request involve adding, in a request queue, a first entry identifying the prefetch operation in response to the prefetch request, and adding, in the request queue, a second entry identifying the fetch operation in response to the fetch request. Additionally, canceling the obtained prefetched request preferably involves invalidating the first entry in the request queue when the fetch request is obtained before the prefetch operation initiates, and maintaining the first entry in the request queue in a valid form when the fetch request is obtained after the prefetch operation initiates. Such adding, validating, and invalidating of entries are preferably performed using circuitry that controls values within fields of entries of the request queue.

Preferably, the technique further involves attempting to retrieve the second set of instructions from a cache to create the cache miss, and generating, in response to the cache miss, a series of requests beginning with the fetch request followed by at least one prefetch request. As such, the series of requests may include the fetch request followed by multiple prefetch requests. Subsequent requests within the series of requests may identify memory access operations that access contiguous or discontiguous areas within the memory.

It should be understood that the obtained prefetch request belongs to a previous series of requests beginning with a previous fetch request and at least one previous prefetch request.

The technique preferably further involves generating a prevent signal that prevents cancellation of new prefetch requests that are obtained after the fetch request.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF A PREFERRED EMBODIMENT

Figure 1:
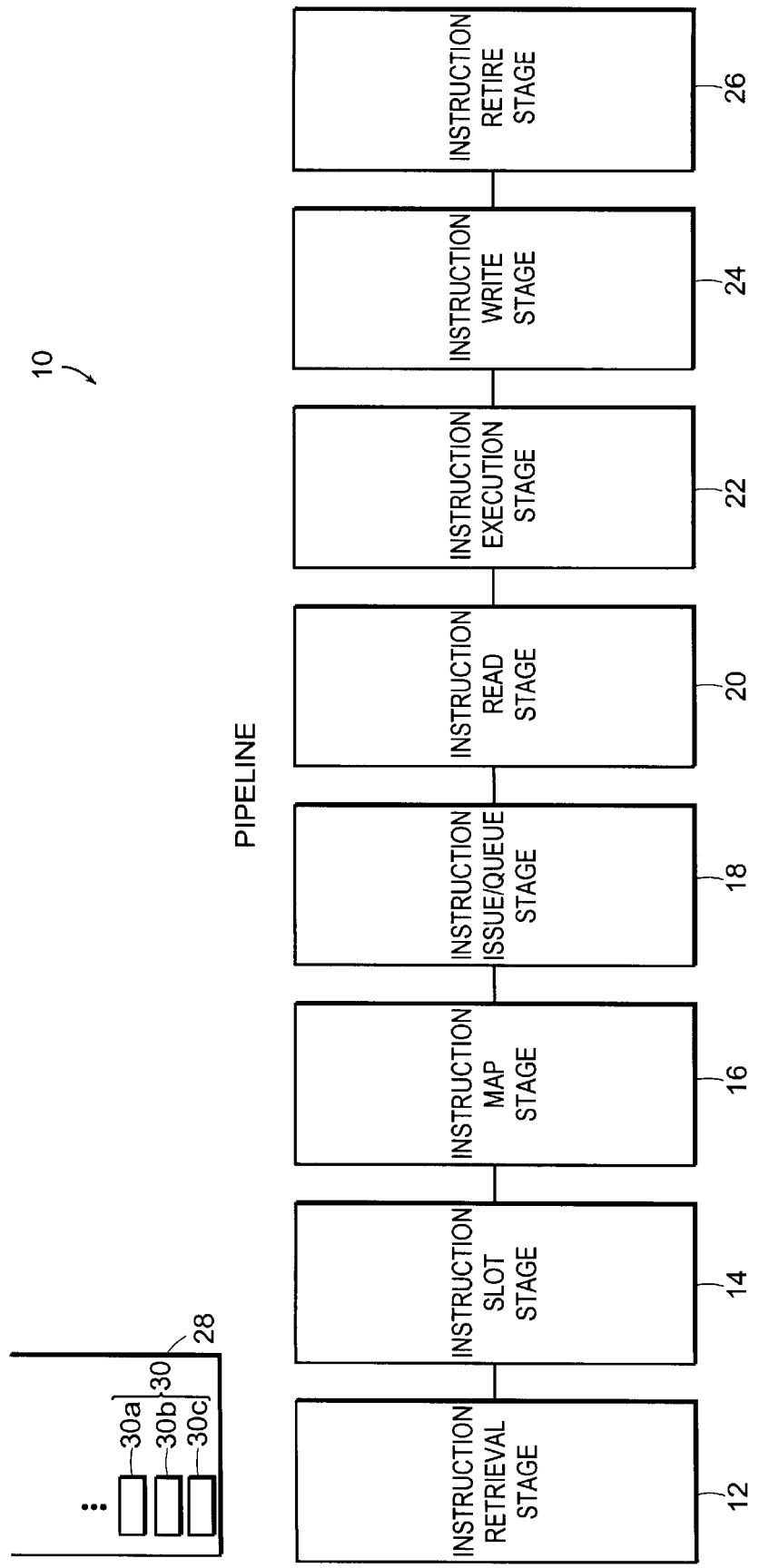
FIG. 1 is a block diagram of a pipeline for a data processor according to an embodiment of the invention.

An embodiment of the invention is directed to a technique for minimizing excessive instruction retrieval by a data processor, such as the processor 10 shown in FIG. 1. The processor 10 is formed by a series of pipelined stages or pipeline. In particular, the processor 10 includes an instruction retrieval stage 12, an instruction slot stage 14, an instruction map stage 16, an instruction issue/queue stage 18, an instruction read stage 20, an instruction execution stage 22, an instruction write stage 24, and an instruction retire stage 26.

The processor 10 connects with a memory 28 to process a stream of instructions 30 (e.g., instructions 30A, 30B and 30C). In general, the processor 10 processes an instruction as follows. First, the instruction retrieval stage 12 retrieves the instruction from the memory 28. Second, the instruction slot stage 14 determines to which execution unit the retrieved instruction should be sent, e.g., an integer unit or a floating point unit (not shown). Third, the instruction map stage 16 maps the instruction such that the instruction refers to physical registers rather than logical registers. Fourth, the instruction issue/queue stage 18 queues the instruction for execution. Fifth, the instruction read stage 20 reads data used by the instruction from the physical registers. Next, the instruction execution stage 22 executes the instruction. Then, the instruction write stage 24 stores results of the executed instruction into a physical register. Finally, the instruction retire stage 26 retires the instruction by committing the state of the processor to the results of the executed instruction.

Figure 2:
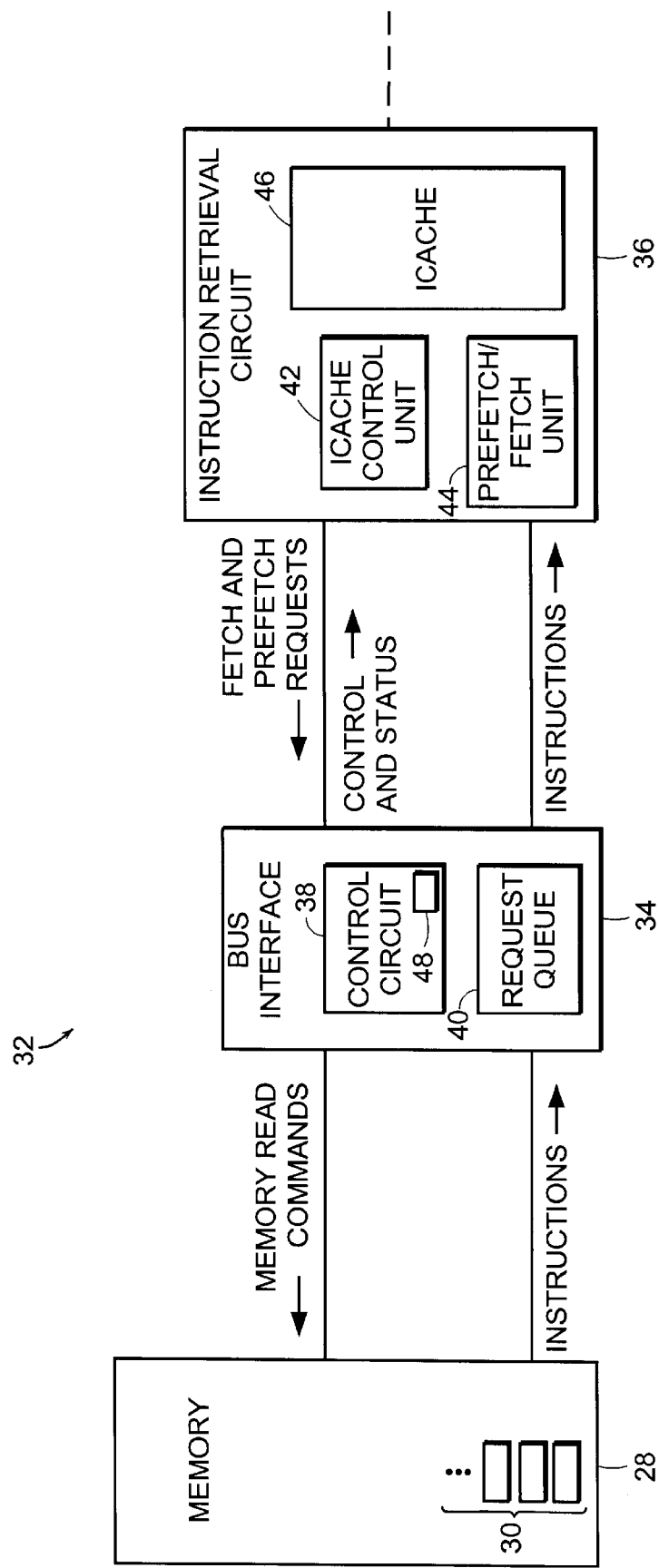
FIG. 2 is a block diagram of a portion of the pipeline of FIG. 1 that retrieves instructions from memory.

FIG. 2 shows the memory 28 (see FIG. 1) and a portion 32 of the processor 10 that retrieves sets of instructions from the memory 28. In particular, the portion 32 includes a bus interface 34 and an instruction retrieval circuit 36. Preferably, the bus interface 34 and the instruction retrieval circuit 36 form part of the instruction retrieval stage 12.

The bus interface 34 includes a control circuit 38 for controlling the operation of the bus interface 34, and a request queue 40 for scheduling and tracking memory access requests. The instruction retrieval circuit 36 includes an instruction cache control unit 42 for controlling the operation of the instruction retrieval circuit 36, a prefetch/fetch unit 44 for generating memory access requests, and an instruction cache (ICACHE) 46 for temporarily storing instructions from the bus interface 34 for use by subsequent stages of the processor 10.

The bus interface 34, under control of the control circuit 38, communicates with the memory 28 and the instruction retrieval circuit 36 through connections carrying digital signals. In particular, the bus interface 34 receives memory access requests from the instruction retrieval circuit 36 and, in response, provides memory read commands to the memory 28. Additionally, the bus interface 34 receives instructions 30 from the memory 28 and, in response, provides the instructions 30 and control and status information to the instruction retrieval circuit 36. Control registers (e.g., a control register 48) direct particular operations of the bus interfaces 34 as will be explained in further detail later.

Figure 3:
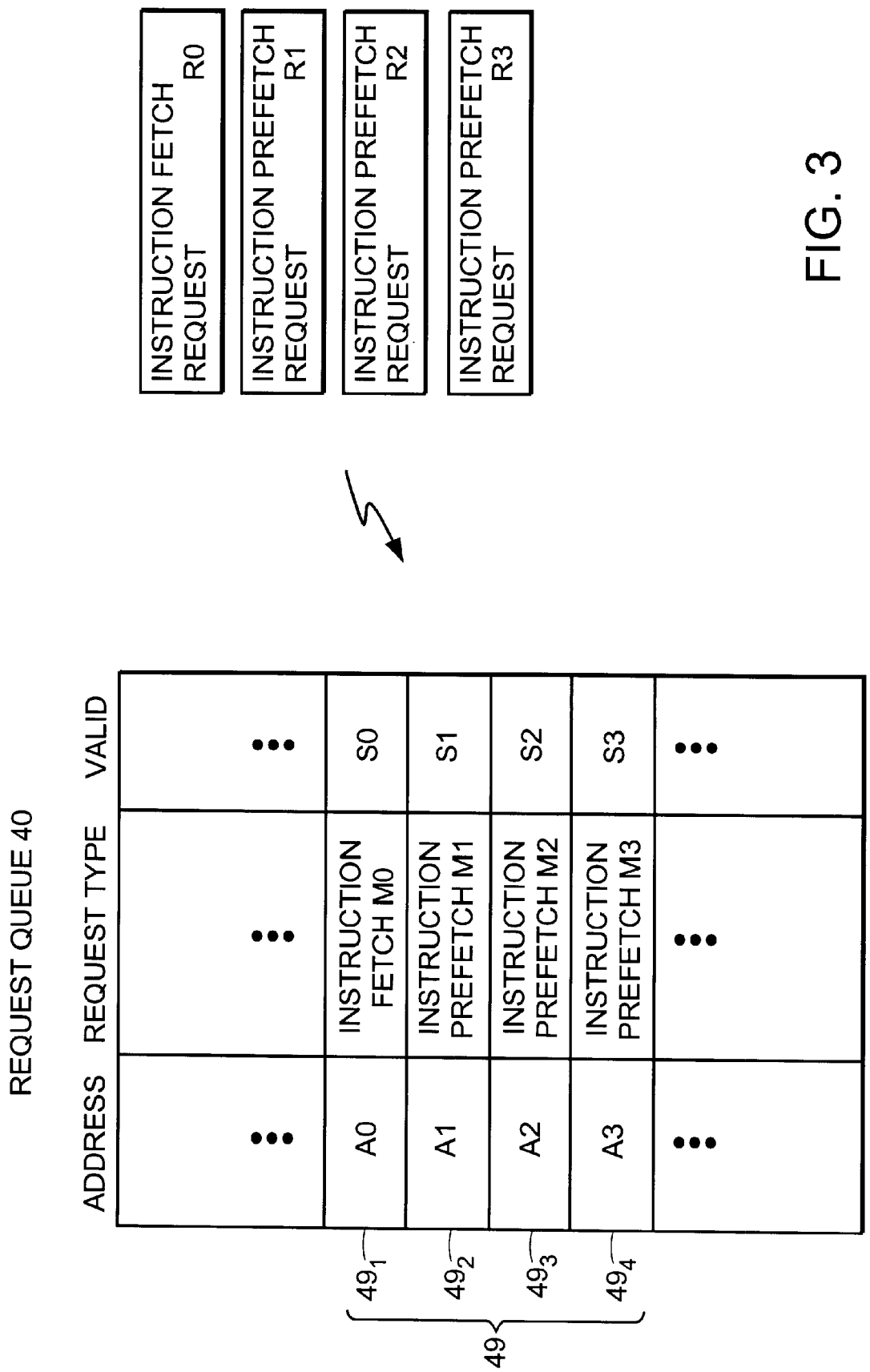
FIG. 3 is a block diagram of a request queue of a bus interface of FIG. 2.

The bus interface 34 uses the request queue 40 to schedule and track memory access operations requested by the instruction retrieval circuit 36. As shown in FIG. 3, the request queue 40 of the bus interface 34 includes multiple entries 49 (e.g., entries $49_0$, $49_1$, $49_2$ and $49_3$), each of which is capable of identifying a memory access operation that is either scheduled to be performed or in the process of being performed by the bus interface 34. Each entry includes an address field, a request type field, and a valid field.

When the bus interface 34 receives a memory access request from the instruction retrieval circuit 36, the bus interface 34 schedules the memory access request by selecting an unused entry 49 of the request queue 40 and updating that entry 49 with information regarding the memory access request. In particular, the control circuit 38 stores the address of the requested instruction in the address field of the entry 49 and the type of request in the request type field of the entry 49, and sets the valid field of the entry 49 to indicate that the entry 49 is now in use.

For each scheduled memory access operation scheduled in an entry (e.g., entry $49_1$,) of the request queue 40, the address field of that entry identifies the location of a set of instructions to be retrieved from the memory 28. In one embodiment, the address field stores both data and program instruction addresses. In another embodiment, the address field stores only program instruction addresses.

The request type of an entry in the request queue 40 identifies the type of memory access request that caused scheduling of the memory access operation. One such request type is an instruction fetch request which instructs the bus interface 34 to read a set of instructions from the memory 28 in response to a demand for that instruction from a subsequent stage of the processor (e.g., the instruction slot stage 14).

Another type of request is an instruction prefetch request which instructs the bus interface 34 to speculatively read a set of instructions from the memory 28 in response to a predicted need for that set by the subsequent stage. Still another type of request may be a data reference.

The valid field of an entry indicates whether the entry is valid, i.e., whether a memory access request has been scheduled by the bus interface 34 but not fully satisfied or fulfilled (that is, whether the memory access operation is still "in-flight"), or whether that request has been satisfied such that the entry is available again for use by another memory access request.

By way of example, FIG. 3 shows a set of four memory access requests (R0 through R3) sent from the instruction retrieval circuit 36 to the bus interface 34. Memory access request R0 is an instruction fetch request which instructs the bus interface 34 to read a set of instructions from the memory 28 in response to a demand from the instruction slot stage 14. Memory access requests R1, R2, and R3 are instruction prefetch requests which instruct the bus interface 34 to read sets of instructions from the memory 28 in response to predicted needs of the instruction slot stage 14.

The control circuit 38 of the bus interface 34 handles scheduling of the memory access requests within the request queue 40. For example, the control circuit 38 associates entries 490 through 493 with the memory access requests R0 through R3, respectively. Further details of the scheduling process of the control circuit 38 will be provided later.

While the control circuit 38 queues memory access requests received from the instruction retrieval circuit 36, the control circuit 38 also retrieves sets of instructions from the memory 28 to satisfy the queued requests. In particular, the control circuit 38 sends a read command to read a set of instructions from the memory 28 based on an entry of the request queue 40. When the set of instructions arrives from the memory 28, the control circuit 38 conveys the set to the instruction retrieval circuit 38 and invalidates the entry associated with the retrieved instruction. In particular, the control circuit 38 clears the valid field of that entry to indicate that the entry is available for use to queue another memory access request. Once the valid field of an entry is cleared, the instruction retrieval operation is no longer considered to be in-flight. The control circuit 38 repeats this process for other entries within the request queue in order to satisfy other memory access requests.

Figure 4:
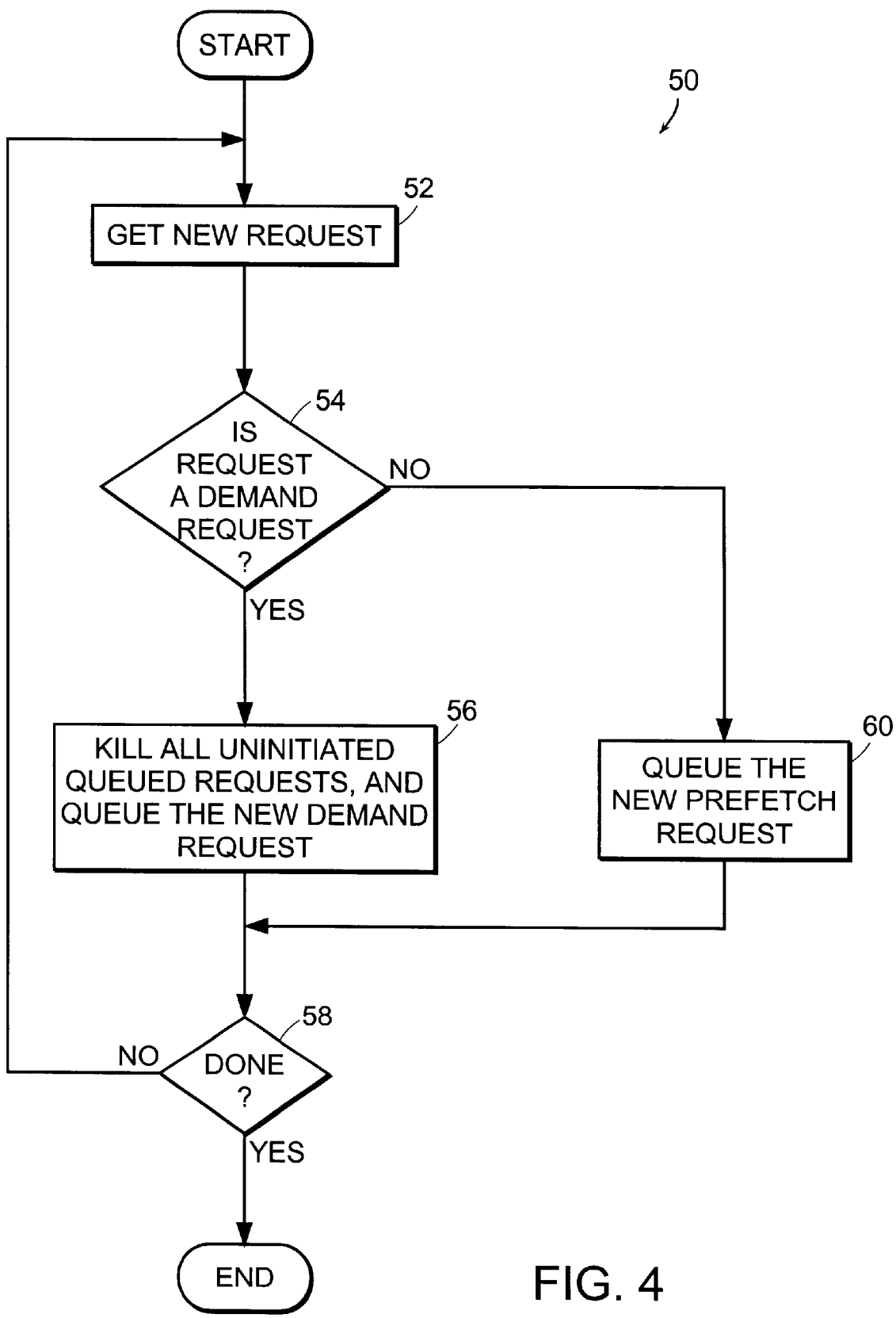
FIG. 4 is a flow diagram showing the operation of the portion of the pipeline of FIG. 2.

Further details of the queuing operation of the bus interface 34 will now be provided with reference to FIG. 4 which illustrates a scheduling procedure 50 performed by the control circuit 38. In step 52, the control circuit 38 receives a new memory access request from the instruction retrieval stage 36. In step 54, the control circuit 38 determines whether the new memory access request is an instruction fetch request or an instruction prefetch request. If the new memory access request is an instruction fetch request, step 54 proceeds to step 56. In step 56, the control circuit 38 kills (or cancels) all uninitiated memory access requests in the request queue 40, and queues the new instruction fetch request (e.g., by clearing the valid field of the entries of the uninitiated requests). On the other hand, in the case of an instruction prefetch request, step 54 proceeds to step 60. In step 60, the control circuit 38 simply queues the new instruction prefetch request in the request queue 40.

Steps 56 and 60 proceed to Step 58. In step 58, the control circuit 38 determines whether it should continue to queue memory access requests. If the control circuit 38 determines that it should continue, step 58 proceeds back to step 52 to handle another memory access request. Preferably, the control circuit 38 continues to queue such requests until a power down or reset condition occurs within the processor 10.

As the control circuit 38 performs the scheduling procedure 50, it should be understood that the control circuit 38 also operates to fulfill the queued memory access requests as described earlier.

It should be understood that instruction fetch requests are sent from the instruction retrieval circuit 38 by the bus interface 34 when a demand for a particular instruction is received from a subsequent stage. When the bus interface 34 receives the instruction fetch request, any instruction prefetch requests that have not initiated are no longer needed. In particular, if a queued instruction prefetch request were to coincidently instruct the bus interface 34 to retrieve the same instruction identified by the received instruction fetch request, it is of no consequence that the instruction prefetch request is killed since the instruction fetch request will serve to retrieve the set of instructions. On the other hand, if no queued instruction prefetch requests instruct the bus interface 34 to retrieve the same instruction identified by the received instruction fetch request, the queued instruction prefetch requests likely identify instructions of an incorrect instruction branch which will not be needed by the subsequent stage.

Accordingly, instruction prefetch requests that have not initiated are killed to unschedule unnecessary bus interface operations and, thus, save processor resources.

In one embodiment, only queued instruction prefetch requests are killed by the control circuit 38 when the bus interface receives an instruction fetch request from the instruction retrieval circuit 38. In this embodiment, queued instruction fetch requests are still satisfied.

In another embodiment, all queued memory access requests (both instruction fetch and prefetch requests) are killed. Killing of queued instruction fetch requests reduces excessive instruction retrieval even further than killing only instruction prefetch requests.

Figure 5:
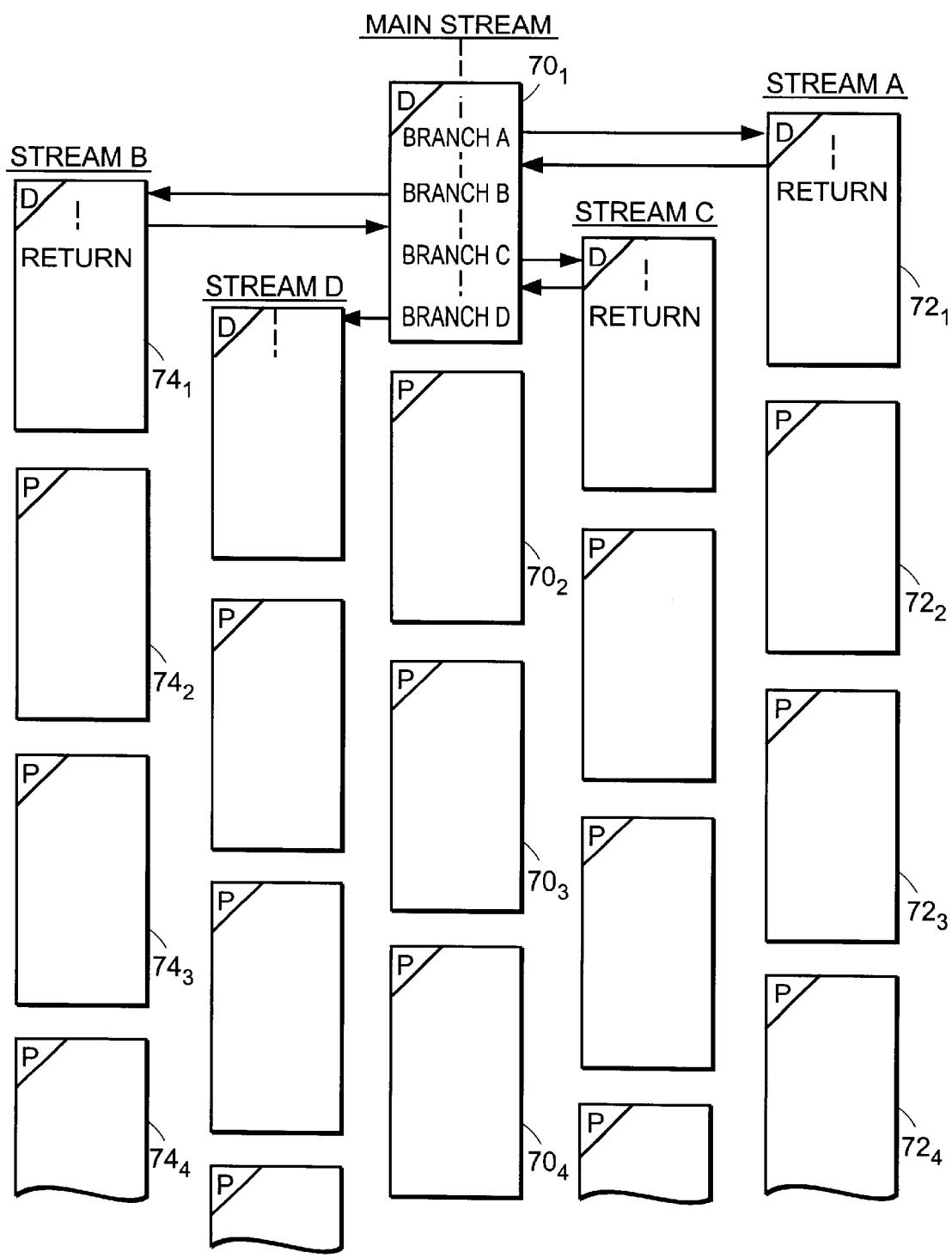
FIG. 5 is a block diagram of sets of instructions that are capable of being processed by the portion of the pipeline of FIG. 2.

FIG. 5 illustrates, by way of example, a benefit of reducing excessive instruction retrieval by the processor 10. Suppose that the instruction retrieval circuit 38 initially sends the bus interface 34 an instruction fetch request and three instruction prefetch requests for sets of instructions $70_1$, $70_2$, $70_3$, and $70_4$ (collectively sets 70) of a main stream of code. Set $70_1$, includes multiple conditional branch instructions (e.g., BRANCH A, BRANCH B, BRANCH C, and BRANCH D). Further suppose that the bus interface 34 has retrieved set $70_1$, from the memory 28 and sent set $70_1$, to subsequent stages of the processor 10 for further processing, but has not had an opportunity to initiate retrieval of sets $70_2$, $70_3$, and $70_4$.

When BRANCH A executes in the instruction execution stage 22, the processor 10 determines that execution should proceed down a code stream (e.g., STREAM A) that is different than the main stream. As a result, the instruction retrieval circuit 36 (signaled by execution related circuitry within the processor 10) sends to the bus interface 34 a new instruction fetch request for a new set of instructions $72_1$, and three new instruction prefetch requests for new sets of instructions $72_2$, $72_3$, and $72^4$. The bus interface 34 responds by invalidating the requests for sets $70_2$, $70_3$, and $70_4$, which have not initiated, and queuing the new requests for sets $72_1$, $72_2$, $72_3$, and $72_4$ (see step 56 of FIG. 4). The invalidation of memory access requests for sets $70_2$, $70_3$, and $70_4$ avoids excessive and unnecessary instruction retrieval that would otherwise have wasted processor resources.

Suppose that the instruction set $72_1$, includes a RETURN instruction that causes instruction execution to return to the main stream of code. Further suppose that the processor 10 determines that execution should proceed down STREAM B. As a result, the instruction retrieval circuit 36 sends to the bus interface 34 a new instruction fetch request for a new set of instructions $74_1$, and three new instruction prefetch requests for new sets of instructions $74_2$, $74_3$ and $74_4$. The bus interface 34 responds by invalidating the requests for sets $72_2$, $72_3$, and $72_4$, which have not initiated, and queuing the new requests for sets $74_1$, $74_2$, $74_3$, and $74_4$. Again, the invalidation of uninitiated memory access operations (e.g., to retrieve sets $72_2$, $72_3$ and $72_4$) avoids excessive and unnecessary instruction retrieval that would otherwise have wasted processor resources.

Similar situations may occur for other mispredictions (e.g, for other code streams such as STREAM C and STREAM D), as shown in FIG. 5. Without the above-described technique, the bus interface 34 would retrieve the instruction sets corresponding to these requests wasting processor resources. However, with such a technique, processor resources (e.g., the bus interface 34) are prevented from unnecessarily retrieving instructions that will not be executed (e.g., sets $72^2$, $72^3$, $72_4$, $74_2$, $74_3$, and $74_4$), enabling such resources to attend to other operations.

The operation of the bus interface 34 can be controlled through the use of control registers within the control circuit 38. In particular, setting or clearing a bit of a control register 48 directs the bus interface 34 to enable or disable cancellation of memory access requests. That is, setting the bit enables the bus interface 34 to operate according to the scheduling procedure 50 of FIG. 4. Clearing the bit disables the scheduling procedure 50, forcing the bus interface 34 to process each memory access request received from the instruction retrieval circuit 36 without cancellation in a conventional manner.

EQUIVALENTS

While this invention has been particularly shown and described with references to preferred embodiments thereof, it will be understood by those skilled in the art that various changes in form and details may be made therein without departing from the spirit and scope of the invention as defined by the appended claims.

For example, according to the provided explanation, each memory access request identifies a set of instructions to be retrieved from memory. In one embodiment, each memory access request identifies exactly one instruction (i.e., a set of one instruction). Accordingly, for this embodiment four memory access requests consisting of an instruction fetch request followed by three instruction prefetch requests retrieves a block of only four instructions. In another embodiment, each memory access request identifies multiple instructions (e.g., a standard number of instructions suitable for the processor 10 to handle) to be retrieved from the memory.

Furthermore, there is no requirement that the retrieved sets of instructions be contiguous in program order. According to the invention, the sets of instructions may be discontiguous. For example, for four memory access requests consisting of an instruction fetch request followed by three instruction prefetch requests, the first two memory access requests may identify instructions from a first section of a program, and the subsequent two memory access instructions may identify instructions from a different section of the program that is discontiguous from the first section. Accordingly, subsequent requests within the series of requests identify memory access operations that access discontiguous areas within the memory.

What is claimed is:

1. A method for controlling memory access requests, comprising the steps of queuing a prefetch request for performing a prefetch operation that prefetches a first set of instructions from a memory;

adding, in a request queue, a first entry identifying the prefetch operation in response to the prefetch request;

subsequently queuing a fetch request for performing a fetch operation that fetches a second set of instructions from the memory to satisfy a cache miss;

adding, in the request queue, a second entry identifying the fetch operation in response to the fetch request; and canceling the queued prefetch request when the fetch request is received before the prefetch operation initiates in response to the queued prefetch request, and performing the prefetch operation to completion when the fetch request is received after the prefetch operation initiates in response to the queued prefetch request.

2. the method of claim 1 wherein the step of canceling and performing includes the step of invalidating the first entry in the request queue when the fetch request is obtained before the prefetch operation initiates, and maintaining the first entry in the request queue in a valid form when the fetch request is obtained after the prefetch operation initiates.

3. The method of claim 1 further comprising the step of:

attempting to retrieve the second set of instructions from a cache to create the cache miss; and generating, in response to the cache miss, a series of requests beginning with the fetch request followed by at least one prefetch request.

4. The method of claim 3 wherein the series of requests includes the fetch request followed by multiple prefetch requests.

5. The method of claim 4 wherein subsequent requests within the series of requests identify memory access operations that access discontiguous areas within the memory.

6. The method of claim 3 wherein the obtained prefetch request belongs to a previous series of requests beginning with a previous fetch request and at least one previous prefetch request.

7. The method of claim 1 further comprising the step of:

generating a prevent signal that prevents cancellation of new prefetch requests that are obtained after the fetch request.

8. An apparatus for controlling memory access requests to a memory, the apparatus comprising:

an instruction retrieval circuit; and an interface circuit, coupled to the instruction retrieval circuit, the interface circuit including a request queue and a control circuit coupled to the request queue, wherein:

the interface circuit queues, from the instruction retrieval circuit, a prefetch request for performing a prefetch operation that prefetches a first set of instructions from the memory, and the control circuit adds, in the request queue, a first entry identifying the prefetch operation in response to the prefetch request;

the interface circuit subsequently queues, from the instruction retrieval circuit, a fetch request for performing a fetch operation that fetches a second set of instructions from the memory to satisfy a cache miss, and the control circuit adds, in the request queue, a second entry identifying the fetch operation in response to the to the fetch request; and the interface circuit cancels the queued prefetch request when the fetch request is received from the instruction retrieval circuit before the prefetch operation initiates in response to the queued prefetch request, and performs the prefetch operation to completion when the fetch request is received from the instruction retrieval circuit after the prefetch operation initiates in response to the obtained prefetch request.

9. the apparatus of claim 8 wherein the control circuit is capable of invalidating the first entry in the request queue when the fetch request is obtained before the prefetch operation initiates, and maintaining the first entry in the request queue in a valid form when the fetch request is obtained after the prefetch operation initiates.

10. The apparatus of claim 8 wherein the instruction retrieval circuit includes:
- an instruction cache; and
- a control unit, coupled to the instruction cache, that (i) attempts to retrieve the second set of instructions from a cache to create the cache miss, and (ii) generates, in response to the cache miss, a series of requests beginning with the fetch request followed by at least one prefetch request.

11. The apparatus of claim 10 wherein the series of requests includes the fetch request followed by multiple prefetch requests.

12. The apparatus of claim 11 wherein subsequent requests within the series of requests identify memory access operations that access discontiguous areas within the memory.

13. The apparatus of claim 10 wherein the obtained prefetch request belongs to a previous series of requests beginning with a previous fetch request and at least one previous prefetch request.

14. The apparatus of claim 8 wherein the interface circuit includes circuitry that generates a prevent signal that prevents cancellation of new prefetch requests that are obtained after the fetch request.

15. A method for controlling memory access requests, comprising the steps of:
- acquiring a first series of requests including a prefetch request for performing a prefetch operation that prefetches a first set of instructions from a memory, and adding a first entry in a request queue in response to the prefetch request, the first entry identifying the prefetch operation;
- attempting to retrieve a second set of instructions from a cache to create a cache miss, and generating, in response to the cache miss, a second series of requests including a fetch request for performing a fetch operation that fetches the second set of instructions from the memory to satisfy the cache miss;
- acquiring the second series of requests that includes the fetch request, and adding a second entry in the request queue in response to the fetch request, the second entry identifying the fetch operation; and
- invalidating the first entry in the request queue when the fetch request is acquired before the prefetch operation initiates, and maintaining the first entry in valid form in the request queue and performing the prefetch operation to completion when the fetch request is acquired after the prefetch operation initiates.

16. An apparatus for controlling memory access requests to a memory, the apparatus comprising:
- an instruction retrieval circuit having:
  - a cache, and
  - a control circuit, coupled to the cache, that attempts to retrieve a first set of instructions from the cache to create a cache miss, and generates, in response to the cache miss, a first series of requests including a fetch request for performing a fetch operation that fetches the first set of instructions from a memory to satisfy the cache miss; and
- an interface circuit, coupled to the instruction retrieval circuit, that:
  - acquires a second series of requests including a prefetch request for performing a prefetch operation that prefetches a second set of instructions from the memory, and adds a first entry in a request queue in response to the prefetch request, the first entry identifying the prefetch operation, and
  - after acquiring the second series of requests, acquires the first series of requests that includes the fetch request, and adds a second entry in the request queue in response to the fetch request, the second entry identifying the fetch operation; and
  - invalidates the first entry in the request queue when the fetch request is acquired before the prefetch operation initiates, and otherwise maintaining the first entry in valid form in the request queue and performing the prefetch operation to completion when the fetch request is obtained after the prefetch operation initiates.

17. A method for controlling memory access requests, comprising the steps of:
- queuing a first memory access request for performing a first memory access operation that retrieves a first set of instructions from a memory;
- adding, in a request queue, a first entry identifying the first memory access operation in response to the first memory access request;
- subsequently queuing a second memory access request for performiing a second memory access operation that retrieves a second set of instructions from the memory to satisfy a cache miss;
- adding, in the request queue, a second entry identifying the second memory access operation in response to the second memory access request; and
- canceling the queued first memory access request when the second memory access request is received before the first memory access operation initiates in response to the queued first memory access request, and performing the first memory access operation to completion when the second memory access request is queued after the first memory access operation initiates in response to the received first memory access request.

18. An apparatus for controlling memory access requests to a memory, the apparatus comprising:
- an instruction retrieval circuit; and an interface circuit, coupled to the instruction retrieval circuit, the interface circuit including a request queue and a control circuit coupled to the request queue, wherein:
  - the interface circuit queues, from the instruction retrieval circuit, a first memory access request for performing a first memory access operation that retrieves a first set of instructions from the memory, and the control circuit adds, in the request queue, a first entry identifying the first memory access operation in response to the first memory access request;
  - the interface circuit subsequently queues, from the instruction retrieval circuit, a second memory access request for performing a second memory access operation that retrieves a second set of instructions from the memory to satisfy a cache miss, and the control circuit adds, in the request queue, a second entry identifying the second memory access operation in response to to the second memory access request; and the interface circuit cancels the queued first memory access request when the second memory access request is received from the instruction retrieval circuit before the first memory access operation initiates in response to the queued first memory access request, and performs the first memory access operation to completion when the second memory access request is received from the instruction retrieval circuit after the first memory access operation initiates in response of the queued first memory access request.

* * * * *